United States Patent Office 3,214,125
Patented Oct. 26, 1965

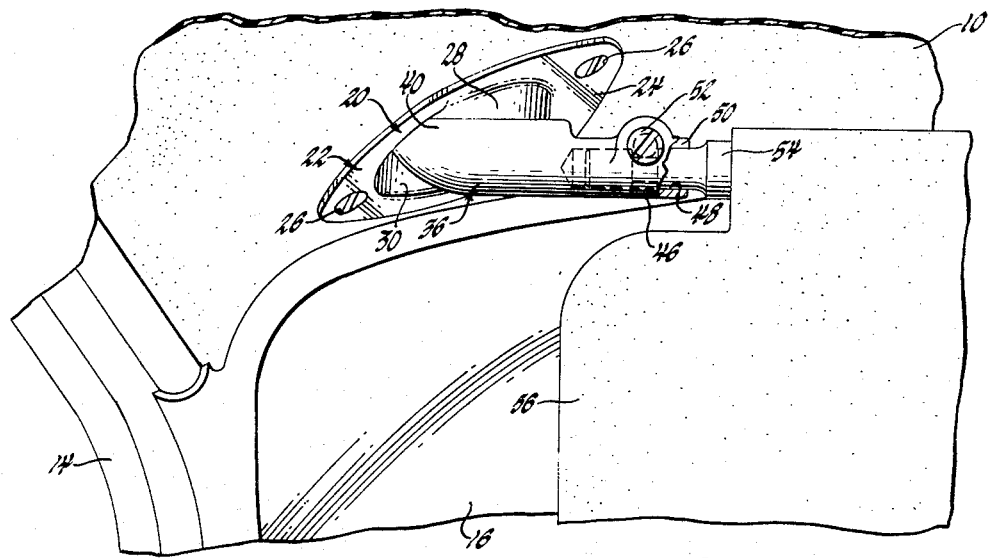
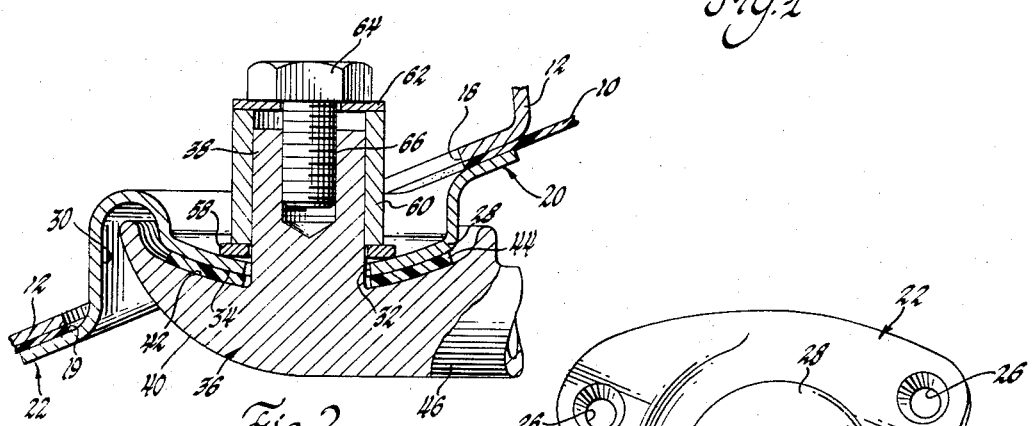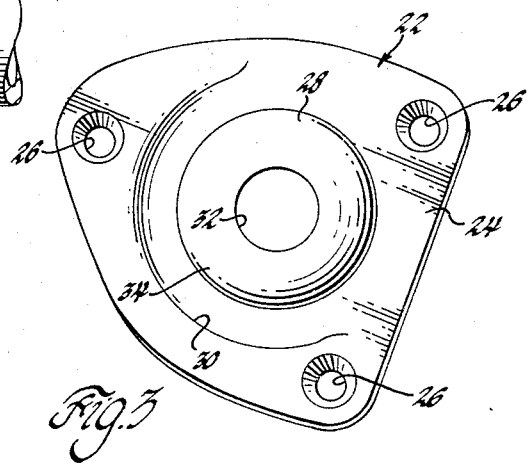

3,214,125
SUNSHADE PIVOTAL SUPPORT ASSEMBLY
John W. Pyuro, Warren, Mich., assignor to General Motors Corporation, Detroit, Mich., a corporation of Delaware
Filed Nov. 8, 1962, Ser. No. 236,348
2 Claims. (Cl. 248—289)

This invention contemplates a sunshade pivotal support assembly for a vehicle body of simple compact economical construction featuring a broadly curved sunshade supporting pivot member adapted to be partially recessed within a roof supporting body header. This construction is particularly conducive to occupant safety under rapid braking or impact deceleration of the vehicle in its elimination of the depending projections and relatively sharp edges or corners of conventional sunshade supporting structures.

The foregoing and other objectives, advantages and features of the invention will be apparent from the following description of a preferred illustrative embodiment having reference to the accompanying drawing, in which:

FIGURE 1 is a fragmentary elevational view showing the sunshade support assembly of the invention mounted in the forward upper left under-roof corner of the passenger compartment interior of an automotive vehicle;

FIGURE 2 is an enlarged fragmentary view corresponding to a portion of FIGURE 1 with portions thereof broken away and transversely sectioned to show details of the sunshade support assembly;

FIGURE 3 is an elevational view of the mounting plate of the sunshade supporting assembly.

Referring more particularly to the drawing, an interior headliner or roof panel 10 conceals a vehicle body roof header partially shown at 12 in FIGURE 2. The header 12 extends transversely of the vehicle and cooperates with the front quarter door pillars 14 and the hood cowl, not shown, to mount the windshield 16. An aperture 18 is provided in the bowed end of the roof header 12 immediately adjacent the corner of the windshield 16. A mating aperture 19 is provided in the roof panel.

A sunshade support assembly incorporating the invention is indicated generally by the reference numeral 20. This assembly suitably secures the roof panel and the aperture therethrough to the header 12 in mating relation with the header aperture 18. The sunshade supporting assembly of the illustrative embodiment includes a support plate 22 having a peripheral flange 24 perforated at 26 to receive screws securing the flange of the plate to the header adjacent the header and roof panel apertures 18 and 19. The plate 22 is preferably of stamped configuration and provides a pivot boss 28 disposed centrally and obliquely of the mounting flange to define a semi-circular recess 30 therebetween at one side of the plate member.

The pivot boss 28 is centrally perforated at 32 and provides a spherical swivel surface 34 formed on a broad radius concentrically embracing the perforation therethrough.

A sunshade supporting member 36 is pivotally mounted with respect to the pivot boss 28. This member comprises a spindle 38 projecting through the perforation of the pivot boss and a sunshade supporting head 40 integral with the spindle 38. The head 40 has an inner spherical surface 42 formed outwardly of the spindle. In assembly this swivel surface spacedly embraces the swivel surface of the pivot boss with a washer 44 of self-lubricating, wear-resistant material having limited elastomeric properties, such as nylon or Teflon, interposed therebetween. The swivel head of the pivot member 36 has an outer spherical surface formed on a broad radius slightly less than that of the swivel surfaces 34 and 42 and is partially housed in the recess defined between the mounting flange and pivot boss of the support plate.

A sunshade supporting arm 46 projects laterally of the swivel head 40 and is tapered tangentially from the outer spherical surface thereof. The distal end of the arm 46 has a bore 48 and is split at 50 to provide a circular clamp which may be tightened by a screw 52 threadable in aligned bosses formed on the upper side of the sunshade supporting arm 46. The circular clamp thus provided is adapted to receive and secure one end of a rod 54 pivotally supporting a sunshade member 56 in a conventional manner.

Frictional engagement between the swivel surfaces of the pivot boss 28, the head 40 and the washer 44 is resiliently maintained by a Belleville spring washer 58. In assembly, this washer is mounted on the spindle 38 and resiliently interposed between the inner surface of the pivot boss 28 and the adjacent end of a spacer sleeve 60 slidably mounted on the spindle 38. A washer 62 thrustably engages the upper end of the spacer sleeve 60 and is adjustably secured to the upper end of the spindle by a bolt 64 threadable therein at 66. Tightening of the bolt 64 thus acts through the sleeve 60 to compressively preload the Belleville washer 58 to provide the frictional loads between the mating surfaces of the pivot boss 28, the pivot head 40 and the interposed washer 44 necessary to maintain the supported sunshade in any adjusted position.

From the foregoing description, it will be seen that the sunshade supporting assembly of the illustrative embodiment is mountable adjacent the extreme upper corner of the windshield mounting roof header thus permitting the use of a substantially longer sunshade than that permitted by conventional sunshade pivotal supporting structures. Such a mounting further permits location of the sunshade supporting rod much closer to the headliner or underroof panel for both aesthetic and safety reasons. The partial recessing of the sunshade supporting pivot head within the outline of the mounting plate, the exposed broadly curved surfaces of the head, and the location of rod clamping screw and bosses all further cooperate to minimize the possibility of any serious occupant head injury occurring as a result of rapid vehicle braking or impact decelerating conditions. It will be further apparent that various changes and modifications might be made in and from the disclosed structure without departing from the spirit and scope of the invention as defined in the following claims.

What is claimed is:
1. A vehicle sunshade support assembly comprising
   a mounting member,
   a support plate attached to the mounting member and including
      a peripheral flange and
      a centrally apertured partispherical pivot boss extending from a cylindrical flange portion, one half of said cylindrical flange portion being spaced from an oppositely directed semicircular flange portion to create a semicircular recess,
   a sunshade supporting pivot member having a head including
      a partispherical inner bearing surface of broad radius,
      a central spindle extending upwardly from the surface through the boss aperture and
      a partispherical outer surface of a radius less than the broad radius and terminating in a lip partially extending into the recess,
   an elastomeric anti-friction disc interposed between the partispherical surfaces,
   a spring washer embracing the spindle and engaging the rear surface of the boss, a spacer sleeve embracing the spindle and engaging the washer, and adjustable attachment means connected to the spindle and engaging the sleeve to preload the spring washer to maintain frictional bearing engagement between the boss, the disc and the bearing surface.

2. A vehicle sunshade support assembly comprising a mounting member, a support plate attached to the mounting member and including
- a peripheral flange and
- a vertically centrally apertured partispherical pivot boss extending from a cylindrical flange portion, one half of said cylindrical flange portion being spaced from an oppositely directed semicircular flange portion to create a semicircular recess and having an outer bearing surface, a sunshade supporting pivot member rotatable in a horizontal plane having a head including
- a partispherical inner bearing surface of broad curvature,
- a central spindle extending upwardly from the inner surface through the boss aperture and having an axial threaded aperture at its terminal end,
- a partispherical outer surface of a curvature less than the inner bearing surface curvature and terminating in a semicircular lip partially extending into the recess, an apertured elastomeric anti-friction disc interposed between the partispherical surfaces and embracing the spindle, a spring washer embracing the spindle and engaging the inner surface of the boss, a spacer sleeve embracing the spindle and engaging the spring washer, a bolt adjustably received within the spindle aperture, and a bolt washer interposed between the bolt head and the sleeve, whereby the bolt is adjustable to preload the spring washer to maintain light frictional bearing engagement between the disc and the bearing surfaces during rotation of the pivot member in a horizontal plane.

References Cited by the Examiner

UNITED STATES PATENTS

| | | | |
|---|---|---|---|
| 2,594,784 | 4/52 | Mead | 248—207 X |
| 2,634,935 | 4/53 | Carpenter | 248—289 |
| 2,698,728 | 1/55 | Hedeen | 248—278 X |
| 2,738,155 | 3/56 | McCormick | 248—289 |

FRANK L. ABBOTT, *Primary Examiner.*